(12) United States Patent
Bergmann et al.

(10) Patent No.: US 6,377,730 B1
(45) Date of Patent: Apr. 23, 2002

(54) WAVEGUIDE BASED COMPONENT OPTICAL SIGNAL POWER AND WAVELENGTH DETECTOR

(75) Inventors: Ernest E. Bergmann, Fountain Hill; Gail A. Bogert, Bethlehem, both of PA (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/534,714

(22) Filed: Mar. 24, 2000

(51) Int. Cl.[7] ................................................. G02B 6/26
(52) U.S. Cl. ............................. 385/39; 385/24; 385/37; 385/46; 359/124
(58) Field of Search ........................... 385/39, 37, 24, 385/46; 359/124, 127, 130

(56) References Cited

U.S. PATENT DOCUMENTS

| | | | |
|---|---|---|---|
| 5,373,517 A | 12/1994 | Dragone | 372/20 |
| 5,515,460 A * | 5/1996 | Stone | 385/24 |
| 5,583,683 A | 12/1996 | Scobey | 359/127 |
| 5,850,292 A | 12/1998 | Braun | 356/419 |

* cited by examiner

*Primary Examiner*—Phan T. H. Palmer
(74) *Attorney, Agent, or Firm*—Duane, Morris & Heckscher LLP

(57) ABSTRACT

A planar waveguide monitor is shown for determining the wavelength and power of component optical signals of a multiplexed optical signal. The monitor includes an optical waveguide router similar to a Dragone router with at least twice as many output waveguides as the number of component optical signals. An array of optical detectors is disposed to detect output optical signals from the output waveguides. The optical detectors produce a plurality of electrical output signals corresponding to the power of each detected output optical signal. The monitor includes a programmable computer to compare the electrical output signals to a predetermined set of output responses. The power and wavelength of each component optical signal of the multiplexed optical signal may be determined from this comparison.

19 Claims, 9 Drawing Sheets

WAVEGUIDE BASED COMPONENT OPTICAL SIGNAL POWER AND WAVELENGTH DETECTOR

FIELD OF THE INVENTION

The present invention is related to power and wavelength monitoring for optical signals, and more specifically to monitoring the wavelength and power of the component optical signals of a multiplexed optical signal.

DESCRIPTION OF THE RELATED ART

Dense Wavelength Division Multiplexing (DWDM) of optical signals has become a popular method to increase transmission bandwidth over existing fiber-optic backbones. In DWDM operation, multiple signal sources having different wavelengths share the same fiber transport system. In effect, the DWDM technology allows a single fiber to function as a plurality of fibers. The typical DWDM spectrum in normal operation is comprised of nearly uniformly spaced spectral components of nearly equal powers. For example, these signal sources often share the same optical fiber with spacing of only 100 GHz, 50 GHz, or even less, between signals within the 1528 to 1565 nm wavelength range defined by the principal gain region of an erbium doped fiber amplifier (EDFA), a typical component of a telecommunication system. Assuming this operating range, the spacing between these component signals is approximately 0.8 nm, 0.4 nm, or even less, respectively.

Semiconductor lasers are commonly used as the signaling sources for telecommunication systems utilizing optical signals. A typical semiconductor laser can be operated in a range of wavelengths depending upon its operating current and temperature. Even at a fixed temperature and current, it is expected that over time, e.g. several years, the wavelength of the light emitted from the laser will gradually shift or drift from the desired operating wavelength to a wavelength that is no longer suitable for the signal's particular wavelength channel assignment. The power output of a laser can also vary over time, often by as much as a factor of ten over approximately a decade of use. By observing the wavelength shift or drift and the output power of an optical signal, the laser performance may be corrected by adjusting the temperature and/or current of the semiconductor laser to maintain the semiconductor laser at desired operating parameters.

Monitoring the wavelength and power of these optical signals, therefore, has become increasingly important as wavelength spacing decreases between the component optical signals of multiplexed optical signals. Commercial optical spectrum analyzers are available for analyzing the wavelength and power levels of component signals of multiplexed optical signals. For example, a grating spectrometer or monochromator disperses optical signals in one dimension onto a detector. The mechanism may be motorized to scan the wavelengths for display on a Cathode Ray Tube (CRT) or strip chart recorder. A grating spectrometer usually has moderate dispersion and so the resolution is also moderate. It is able to cover a significant range of wavelengths without ambiguity because of its large free spectral range.

A scanning Fabry-Perot interferometer may also be used as a spectrum analyzer. This analyzer includes a tunable, narrow-band filter. The optical transmission may also be displayed on a CRT. This device usually has relatively high resolution because it is used at a high order, but consequently the device has a small free spectral range. The analyzer is associated with a figure of merit, its "finesse" which is approximately the ratio of its resolution to its free spectral range. The finesse is related to the reflectivity of the two mirror surfaces utilized by the device, approximately the reciprocal of the fraction of optical loss for a round-trip inside the optical cavity of the interferometer. The lack of a proper optical signal due to poor flatness or parallelism causes the light to deviate from its multiple ideal round-trip path, thereby contributing to a reduction in finesse. Most Fabry-Perot interferometers for high resolution spectral scanning use piezoelectric transducers to mechanically change the mirror-to-mirror separation.

Another functional spectrometer is a Fourier transform spectrometer that takes the output of a scanned two-beam interferometer and calculates the Fourier transform of the signal as a representation of the spectral components of the aggregated optical signal. Again, a motor is used to mechanically drive the change in path length difference of the spectrometer.

All of the above-described spectral analysis methods and devices require the use of mechanical motion to determine the optical spectrum of an optical signal. Monitors have been proposed that do not rely on mechanical motion, such as U.S. Pat. No. 5,850,292 to Braun for a "Wavelength Monitor For Optical Signals," the entirety of which is incorporated herein by reference, but it is still desirable to have an optical wavelength and power monitor that may be integrated into an optical telecommunication system in a cost-effective manner and which can effectively determine the wavelengths and powers of component optical signals of a multiplexed optical signal without reliance on moving parts.

SUMMARY OF THE INVENTION

The present invention is a method and apparatus for determining the wavelength and power of component optical signals of a multiplexed optical signal. The apparatus includes an optical waveguide router and an array of optical detectors. The optical waveguide router includes an input star coupler with at least one input waveguide and a plurality of output waveguides, a plurality of grating arms optically connected to the output waveguides of the input star coupler having path length differences between adjacent grating arms and, and an output star coupler having a plurality of input waveguides optically connected to the grating arms and at least twice as many output waveguides as the number of component optical signals. The array of optical detectors includes a plurality of optical detectors disposed to detect output optical signals from the output waveguides of the output star coupler. The optical detectors produce a plurality of electrical output signals corresponding to the power of each output optical signal. The apparatus also includes a means for comparing the electrical output signal to a predetermined set of output responses, a means for determining the wavelengths of the component optical signals from the comparison, and a means for determining the powers of the component optical signals from the comparison, each of which is preferably computer implemented.

The apparatus for determining the wavelength and power of the component optical signals may be easily incorporated into an optical transmitter system of a telecommunication system. Further, the apparatus is cost efficient and requires no mechanical motion to evaluate the optical spectrum of a multiplexed optical signal.

The above and other features of the present invention will be better understood from the following detailed description of the preferred embodiments of the invention which is provided in connection with the accompanying drawings.

DETAILED DESCRIPTION

Figure 1:
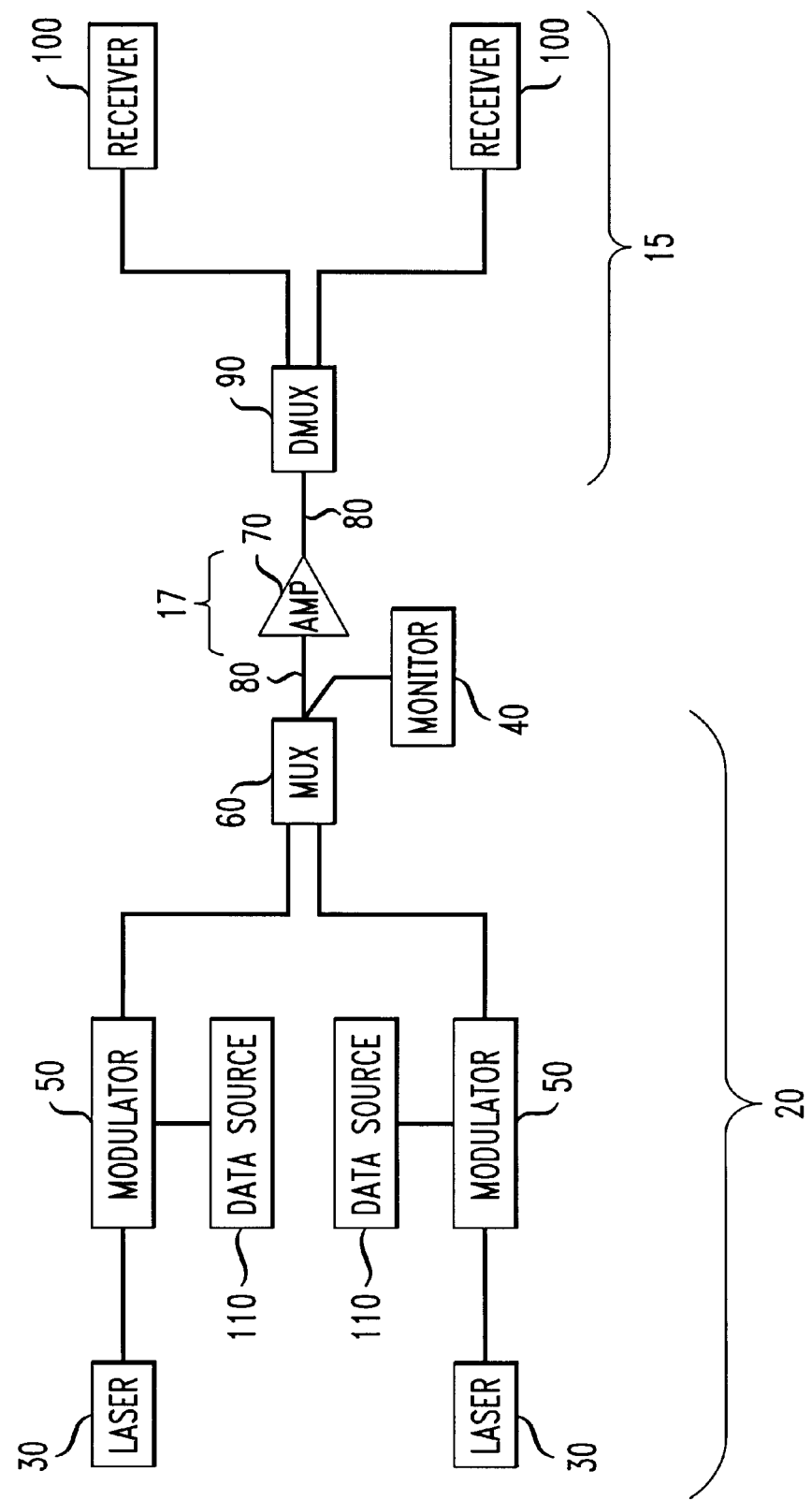
FIG. 1 is a block diagram of a telecommunication system.

FIG. 1 is a diagram of a telecommunication system 10 including an input optical transmitter system 20, a transmission system 17, and a receiver system 15. The input optical transmitter system 20 includes a plurality of optical lasers 30. Each optical laser 30 generates an optical signal having a particular wavelength. A laser 30 may be connected to modulator 50, or a modulation function may be included in laser 30. The optical signal generated by laser 30 is modulated with data generated by data source 110. A plurality of modulated optical signals are multiplexed by multiplexer 60 into a multiplexed optical signal for transmission. The multiplexed optical signal may be, for example, a Dense Wavelength Division Multiplexed (DWDM) signal. A plurality of optical signals, each having different wavelengths, may be transmitted over a single transmission line 80 of transmission system 17 in this manner. Transmission line 80 may be an optical fiber or other optical transmission medium.

The multiplexed signal is often amplified at predetermined distances in transmission system 17 by at least one amplifier 70 if transmitting the multiplexed signal over any extended distance. This amplifier is commonly an erbium doped fiber amplifier (EDFA). The multiplexed signal may be demultiplexed by DMUX 90 after transmission in receiver system 15. An individual optical signal transmitted as a component of the multiplexed optical signal may then be demodulated and processed by a receiver 100. A telecommunication system 10 may include a plurality of transmission lines 80, multiplexers 60, and demultiplexers 90 as optical signals are routed to various destinations. For example, an optical component signal of a multiplexed signal could be removed from a multiplexed signal at a DMUX 90 and the remainder of the multiplexed signal could be transmitted to another destination or even multiplexed with another signal.

The input optical transmitter system 20 may include at least one monitor 40. The monitor 40 may be used to determine the wavelength and power of the component optical signals generated by laser 30 and multiplexed by multiplexer 60. The monitor 40 is preferably integrated into the input optical transmitter system 20 by using a tap device having a known tap ratio to extract a portion of a multiplexed optical signal generated by a multiplexer 60. A monitor 40 may also be disposed to accept a multiplexed optical signal that is generated from optical signals tapped from each laser 30 and multiplexed for purposes of analysis. If only a portion of a multiplexed signal is tapped as an input, this fact should be accounted for in any calculation of the power of the component optical signals, for example, by factoring the tap ratio of the tap into the analysis. Although monitor 40 is depicted in FIG. 1 as a component of the input optical transmitter system 20, the monitor 40 may be included as a component of the transmission system 17 or receiver system 15. The features of monitor 40 and the method by which monitor 40 may be used to determine the wavelength and power of component optical signals of a multiplexed optical signal are described hereafter.

An apparatus for determining the wavelength and power of the component optical signals of a multiplexed optical signal according to the present invention includes an optical waveguide router 200 and an array of optical detectors 300. The optical waveguide router 200 is constructed similar to a Dragone router, as described in U.S. Pat. No. 5,515,460 to Stone and U.S. Pat. No. 5,373,517 to Dragone et al., the entirety of which are incorporated by reference herein, with a modified output.

The optical coupler 200 includes an input star coupler 210 having at least one input waveguide 215 for accepting a multiplexed optical signal for analysis and a plurality of output waveguides 220. A plurality of grating arms 230 are optically connected to the output waveguides 220 of the input star coupler 210. The grating arms are waveguides characterized by a path length difference between each adjacent grating arm. The path length differences may be constant, but need not be. An output star coupler 240 having a plurality of input waveguides 250 is optically connected to the grating arms. The optical waveguide router 200, and specifically the output star coupler 240, includes at least twice as many output waveguides 260 as the number of component optical signals of the multiplexed optical signal accepted at input waveguide 215. The output waveguides 260 are disposed along an output edge 265 of the output star coupler 240.

Figure 3:
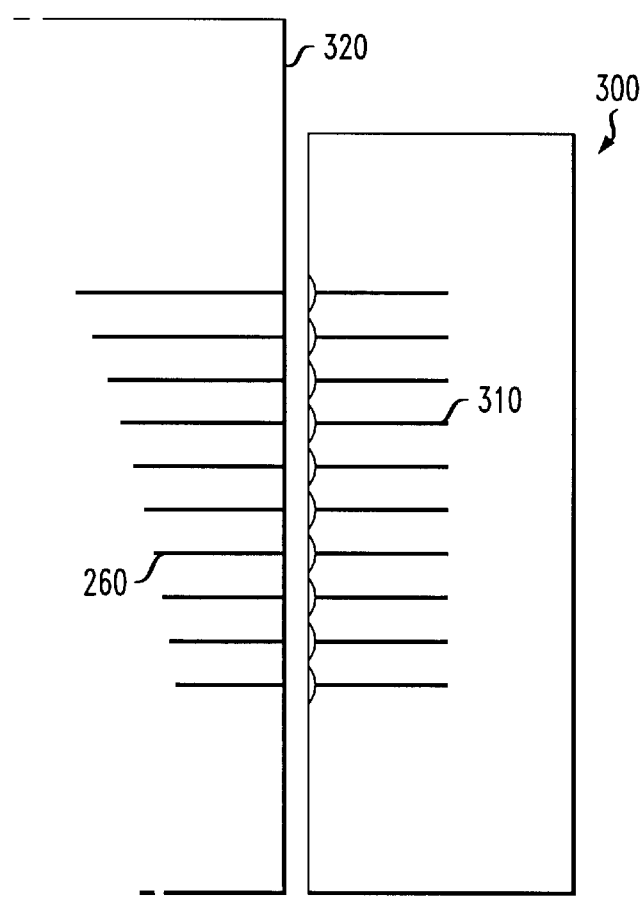
FIG. 3 is a diagram of an exemplary embodiment of the optical detector array according to the present invention.

FIG. 3 shows an array 300 of optical detectors including a plurality of optical detectors 310 disposed to detect output optical signals from the output waveguides 260 of the output star coupler 240. The optical detectors 310 are preferably photodetectors such as photodiodes, and each photodetector produces an electrical output signal corresponding to the power of an output optical signal detected from an output waveguide 260.

Figure 2:
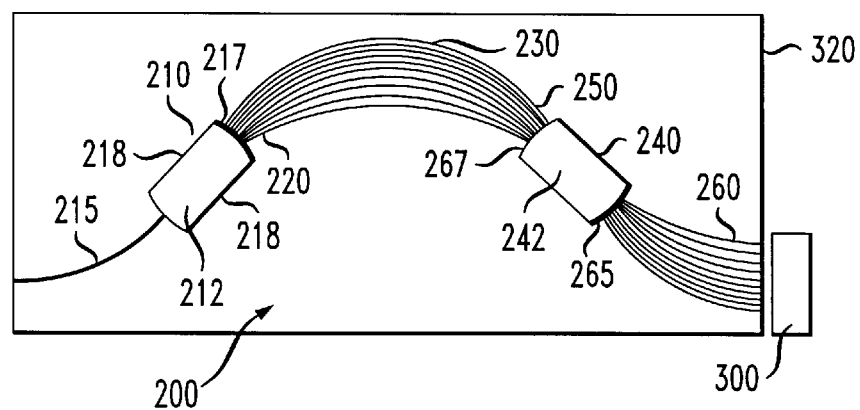
FIG. 2 diagram of an exemplary embodiment of the optical waveguide router according to the present invention.

The optical waveguide router 200 is preferably embodied in a planar waveguide circuit disposed on a substrate. An edge 320 of the planar waveguide circuit is shown in FIGS. 2 and 3, and the optical detector array 300 detects the optical signals emitted at edge 320.

Optical waveguide router 200 functions like a Dragone router, the function of which is briefly described hereafter. A multiplexed optical signal having a plurality of component optical signals is inputted at input waveguide 215. The multiplexed input optical signal enters the free space region 212 of the input star coupler 210 and is optically coupled to the output waveguides 220 at output edge 217 of the star coupler 210. The free space region 212 is so named because light that is previously confined laterally by the narrow character of waveguide 215 is free to spread laterally within the free space region parallel to the substrate surface of the planar waveguide circuit, at least as far as the lateral edges 218 of the input star coupler 210. The doping profile of the free space region is essentially the same as that of input waveguide 215, thereby allowing light to spread laterally along the planar surface of the substrate but not perpendicularly up or down.

From output waveguides 220, the multiplexed input optical signal propagates through each grating arm 230 coupled to the output waveguides 220. Because each adjacent grating arm 230 has a different path length, a wavelength dependent phase shift in the multiplexed optical signals occur. The multiplexed optical signals propagate through the input waveguides 250 of the output star coupler and into the free space region 242 of the output star coupler 240. The relative phase shifts affect the location of convergence of each spectral component of the multiplexed optical signal at the output edge 265 of the output star coupler 240. Consequently, optical signals at different wavelengths are concentrated to different positions along the output edge 265 of the output star coupler 240. Generally, as the number of grating arms 230 increases, the focus of the optical signals along output edge 265 sharpens.

The optical signals of differing wavelengths that are concentrated to different positions along the output edge 265 of the output star coupler 240 are not perfectly focussed though, and are expected to spread some due at least in part to diffraction of the individual optical signals. The output star coupler 240 includes at least twice as many output waveguides 260 as component optical signals. In a double density embodiment of the present invention, there are twice as many output waveguides 260 leading to optical detectors 310 as component optical signals. The outputs measured at optical detectors 310 may be mathematically simulated by representing the output waveguides 260 as filters. Basically, the output waveguides 260 may be represented as filters because they are disposed along the output edge 265 of the second star coupler 240 at locations where optical signals of different wavelengths are expected to focus. The output waveguides 260 do not only accept optical signals that focus at their particular wavelength positions along the output edge 265, however, because the optical signals are not perfectly focussed at a single location.

Figure 4:
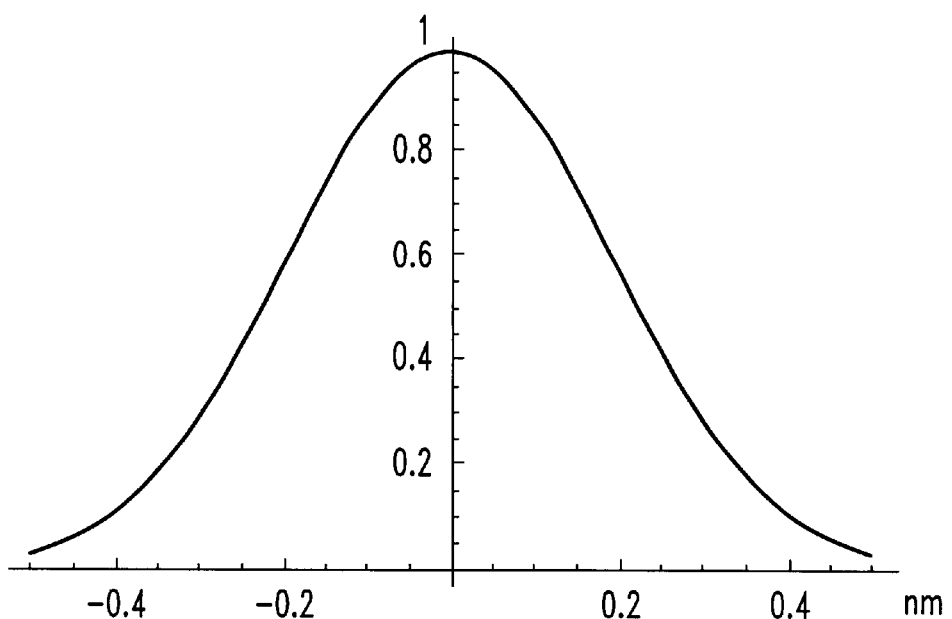
FIG. 4 is a graph of a Gaussian response.

Assuming a channel spectrum having four spectral components at 1550 nm, 1550.8 nm, 1551.6 nm, and 1552.4 nm, the output waveguides 260 may be modeled approximately as Gaussian filters with center wavelength spacings of 0.4 nm and root mean square widths of 0.266667 nm. A typical Gaussian filter response characteristic is shown in FIG. 4. The filter response of an individual filter preferably has some overlap with adjacent filters so that the filter reacts to changes in the wavelengths of light focussing on adjacent filters, i.e., on adjacent output waveguides 260. The filter response shown in FIG. 4 has an approximately 10% overlap in response with an adjacent filter and an approximately 1% or less overlap in response with a filter two or more filter spacing distances away. Modeling output waveguides 260 as filters having Gaussian characteristics, therefore, recognizes that output waveguides 260 accept some optical power from component optical signals that do not focus at their particular locations along output edge 265.

Figure 5:
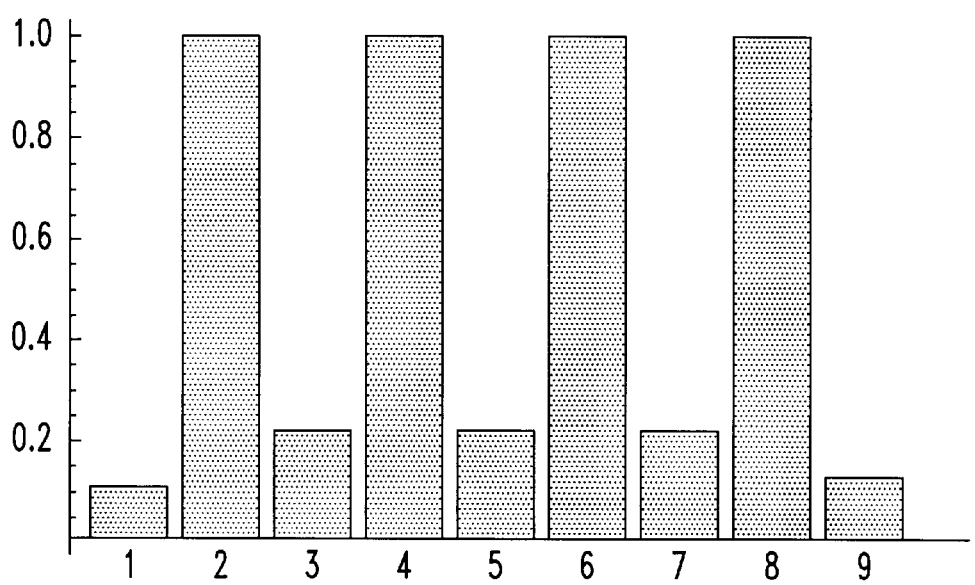
FIG. 5 is a bar graph of a simulated response to an input optical spectrum detected by a double density array of optical detectors according to the present invention.

FIG. 5 is a bar graph of a simulated output response when a multiplexed optical signal including the aforementioned four optical components is inputted to optical waveguide router 200 and detected at optical array 300, assuming the outputs from the output waveguides 260 are simulated by filters with Gaussian responses. The power of each component optical signal is assumed to be equal to one and to be unitless. In FIG. 5, the output shown at 2 is a peak of approximately 1. In the simulation, output 2 is an output from a filter centered at 1550 nm, which represents an output waveguide 260 disposed to accept an optical component of wavelength 1550 nm as it focuses on output edge 265. The same response is shown at outputs 4, 6, and 8 from filters centered at 1550.8, 1551.6, and 1552.4, which in turn represent output waveguides 260 disposed to accept component optical signals of wavelengths 1550.8 nm, 1551.6 nm, and 1552.4 nm, respectively, as they focus on output edge 265.

Figure 6:
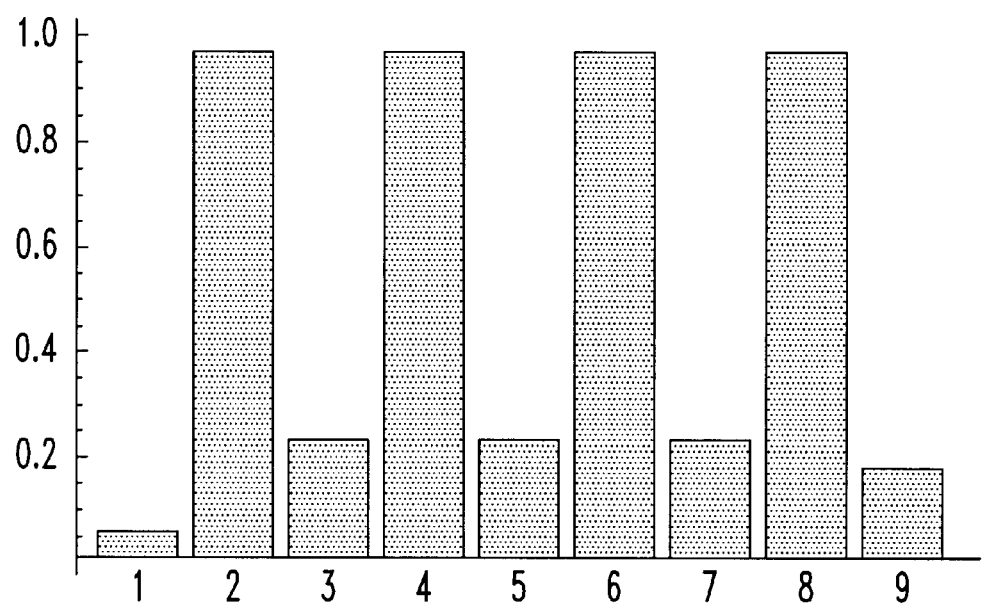
FIG. 6 is a bar graph of a simulated response to a shifted optical spectrum from FIG. 5 detected by a double density array of optical detectors according to the present invention.

FIG. 5 shows that the total output response shows peaks at outputs 2, 4, 6, and 8 corresponding to the four component optical signals of the input multiplexed signal. Because of the response overlap of immediately adjacent filters, there is a non-negligible response shown at outputs 1, 3, 5, 7, and 9. In FIG. 6, the output responses change mostly at outputs 1 and 9 when the wavelengths of all of the optical components are raised by 0.05 nm. The response at output 1 decreases from about 0.1054 to about 0.0580, or about 2.59 dB, but the response at output 9 increases from about 0.1054 to 0.1786, or about 2.29 dB. The responses at output 2, 4, 6, and 8 decrease from about 1 to about 0.97 or less than 0.2 dB. The drop at output 1 indicates that the lowest component optical signal, the component optical signal of wavelength 1550 nm, increased in wavelength, and the rise at output 9 indicates that the highest component optical signal, the optical signal of wavelength 1552.4 nm, also increased in wavelength. There is only a slight shift in the response at outputs 3, 5, and 7 from about 0.2108 to 0.2366, or about 0.50 dB, because of the contrary effects of a lower component optical signal being at a higher wavelength and higher component optical signal going to a higher wavelength.

Figure 7:
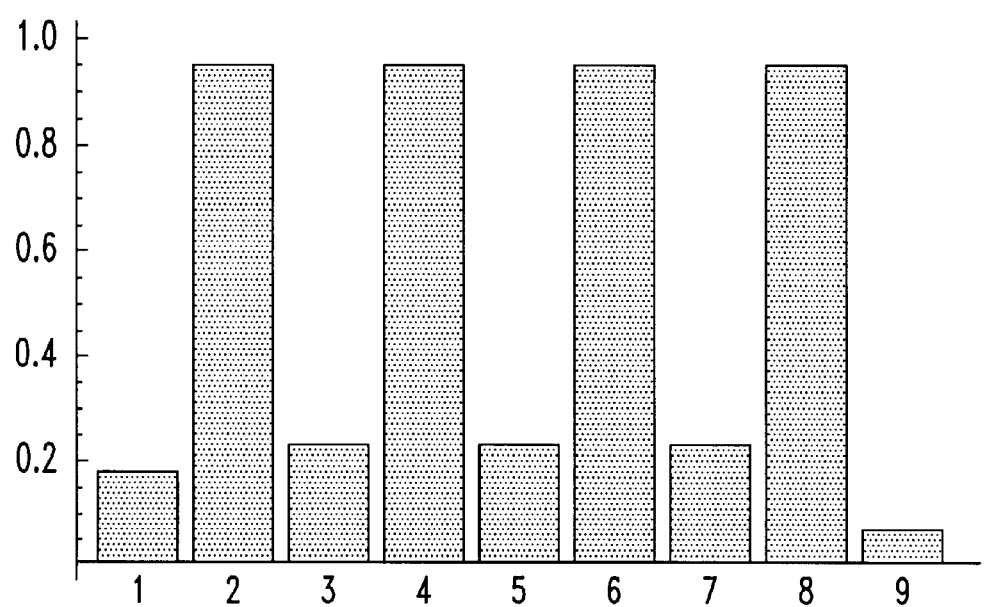
FIG. 7 is a bar graph of a simulated response to a second shifted spectrum from FIG. 5 detected by a double density array of optical detectors according to the present invention.

FIG. 7 is a bar graph showing the results of decreasing the wavelengths of all of the component optical signals by 0.05 nm. The bar graph shows that the responses mirror those shown in FIG. 6, but the graph distinctly shows that the component optical signals have shifted to lower wavelengths.

Figure 8:
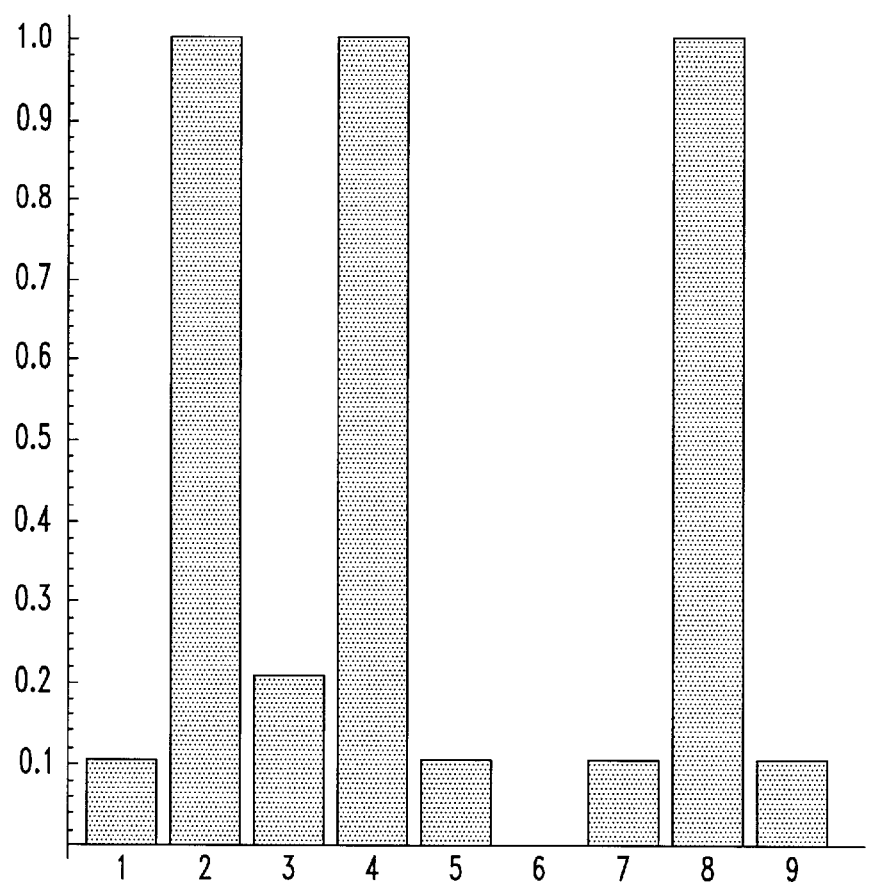
FIG. 8 is a bar graph of a simulated response to the optical spectrum from FIG. 5 with a missing component optical signal detected by a double density array of optical detectors according to the present invention.

FIG. 8 shows the effect of removing a component optical signal from a multiplexed signal. FIG. 8 shows at output 6 that the component optical signal of 1551.8 nm is removed from the input multiplexed optical signal. Only the responses at outputs 5, 6, and 7 show any marked change. The response at output 6 drops to less than 0.00025 and the responses at output 5 and output 7 are smaller than the response at output 3. The response at output 6 does not change to exactly 0.0, though, because the filter at output 6, representing the output waveguide centered to accept a focussed optical signal of 1551.8 nm, overlaps some with the filter responses at outputs 4 and 8. The responses at outputs 5 and 7 drop because the component optical signal centered at 1551.8 is no longer present and the contributions between outputs 5 and 6 and outputs 6 and 7, therefore, disappears.

The simulation characterizing the output waveguides 260 as filters confirms that it is possible to disentangle the effects of shifting component optical signal wavelengths and powers by, for example, by computationaly solving from the responses of at least 8 of the outputs (e.g., outputs 2 through 8) when there are four component optical signals. The actual output waveguides 260 need not function in an exactly Gaussian manner, because in order to determine the wavelength and power of component optical signals of a multiplexed signal accepted at input waveguide 215 of optical waveguide router 200, the output optical signals detected at array 300 are compared to a predetermined set of output responses.

The predetermined set of output responses may be generated by choosing a fixed optical output from a tunable source and varying the output wavelength of the tunable source over a range of wavelengths after the source is connected to input waveguide 215 of an optical waveguide router 200 in a monitor 40. The power of this test input signal is preferably held constant. If the power varies, though, the resulting outputs may be adjusted to account for the variations. Only the responses at each output waveguide 260 that appear significant need to be recorded. For example, if the test input optical signal has a wavelength of 1550 nm, it is expected that little if any response (i.e., non-significant) will appear at an output waveguide 260 disposed to accept a focussed component optical signal having a wavelength of 1551.2 nm. The resulting responses measured by the optical detectors 310 of array 300 may then be recorded as a predetermined set of output responses that may be compared to a set of responses measured by the monitor 40 with an input multiplexed optical signal. Note that there are at least twice as many output optical waveguides 260, and thus twice as many recorded output responses, as the number of component optical signals. It is expected that to solve for N unknowns, there must be at least N equations. Therefore, to solve for power and wavelength for each component optical signal (i.e., twice as many unknowns as the number of component optical signal), at least twice as many outputs are needed.

The comparison of detected output optical signals to the predetermined set of output responses and determination of the wavelength and power of the component optical signals of a multiplexed optical signal from the comparison are preferably software implemented on a programmable computer, microprocessor, microcontroller, or the like. The predetermined set of signal responses may be stored on any computer readable medium, such as a floppy diskette, hard drive, CD-ROM or programmable ROM. For example, the predetermined set of signal values could be generated as a part of the manufacturing process and stored in the ROM of a microcontroller for use in monitor 40. Such a microcontroller may have its own A/D converters as well as adequate ROM storage for the comparison and determination software. The optical detectors 310 produce electrical output signals corresponding to the power of each output optical signal. The electrical output signals may be converted to digital signals by at least one analog to digital (A/D) converter. These converted signals represent the power of the output optical signals detected by the optical detectors 310 from the output optical waveguides 260.

The predetermined set of output responses need not be generated before the outputs optical signals are detected by optical detectors 310, but rather the predetermined set of output responses may be generated after the output responses are measured. The predetermined set of output responses may be compared with any observed peaks in the output responses detected by optical detectors 310. The observed peaks may be scaled because the size of a detected response varies the power of a component optical signal. The comparison may be used to reconstruct the approximate wavelengths and powers of the component optical signals. The approximate values may be used to reconstruct the expected responses that would be measured at each output waveguide 260 in response to the approximated wavelengths and powers of the component optical signals, for example by looking up the responses stored in the predetermined set of output responses and by scaling. The difference between the expected responses and the measured responses may be used to readjust the approximated values for wavelength and power of each component optical signal. These calculations may be re-iterated until the mismatch between the expected responses and the measured responses is minimized or acceptably small.

The use of a predetermined set of output responses obviates the need for stringent manufacturing controls. Variations in construction from monitor 40 to monitor 40 are accounted for by generating a predetermined set of output responses specific to each monitor 40. The use of the predetermined set of output responses will also account for a non-Gaussian response at each output waveguide 260. For example, the response may be another peaked function that is approximately Lorentzian or shows a Voigt profile, for example, or a flatter response. Basically, generating the predetermined set of output responses shows the responses characteristics of an individual monitor 40, and the known response characteristics allows the wavelength and power of the component optical signals to be determined from responses measured by the monitor 40.

As the density of output waveguides 260 increases with respect to the number of component optical signals, the analysis of the detected output optical signals simplifies. A simulation of a triple density embodiment of the present invention, i.e., three times as many output optical waveguides 260 as component optical signals, is presented hereafter.

Figure 9:
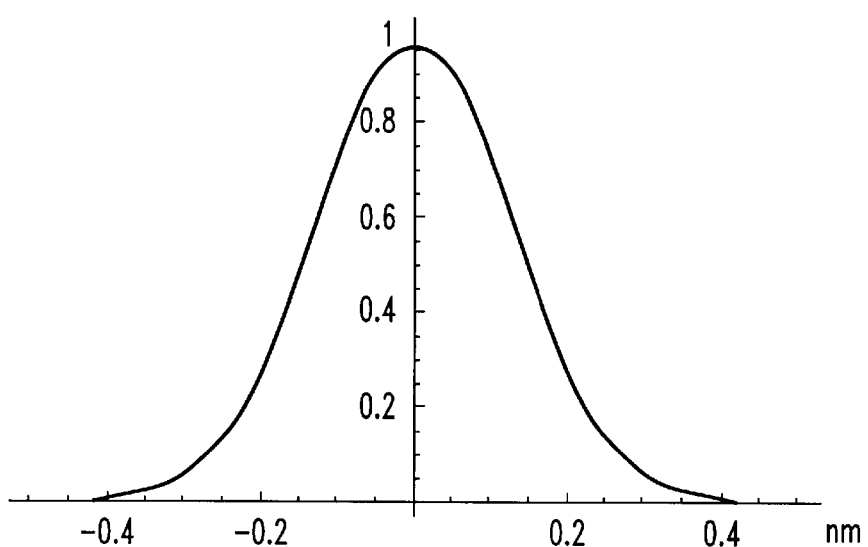
FIG. 9 is a graph of a second Gaussian response.

Assuming the same component optical signals as presented above, namely 1550 nm, 1550.8 nm, 1551.6 nm, and 1552.4 nm, the output waveguides 260 may again be modeled as a filter bank with filters having Gaussian response characteristics in the simulation. Each filter has a filter spacing of a third of the component optical signal spacing, namely 0.266667 nm. The response characteristics of such a filter are shown in FIG. 9. Again, the filter response of an individual filter preferably has some overlap with adjacent filters so that the filter reacts to changes in the wavelengths of light focussing on adjacent filters, i.e., on adjacent output waveguides 260. The root mean square width is 0.177778 nm and the filter has a response of less than 1% at two or more filter spacing distances (e.g., 0.533 nm) and an approximately 10% response overlap with an immediately adjacent filter.

Figure 10:
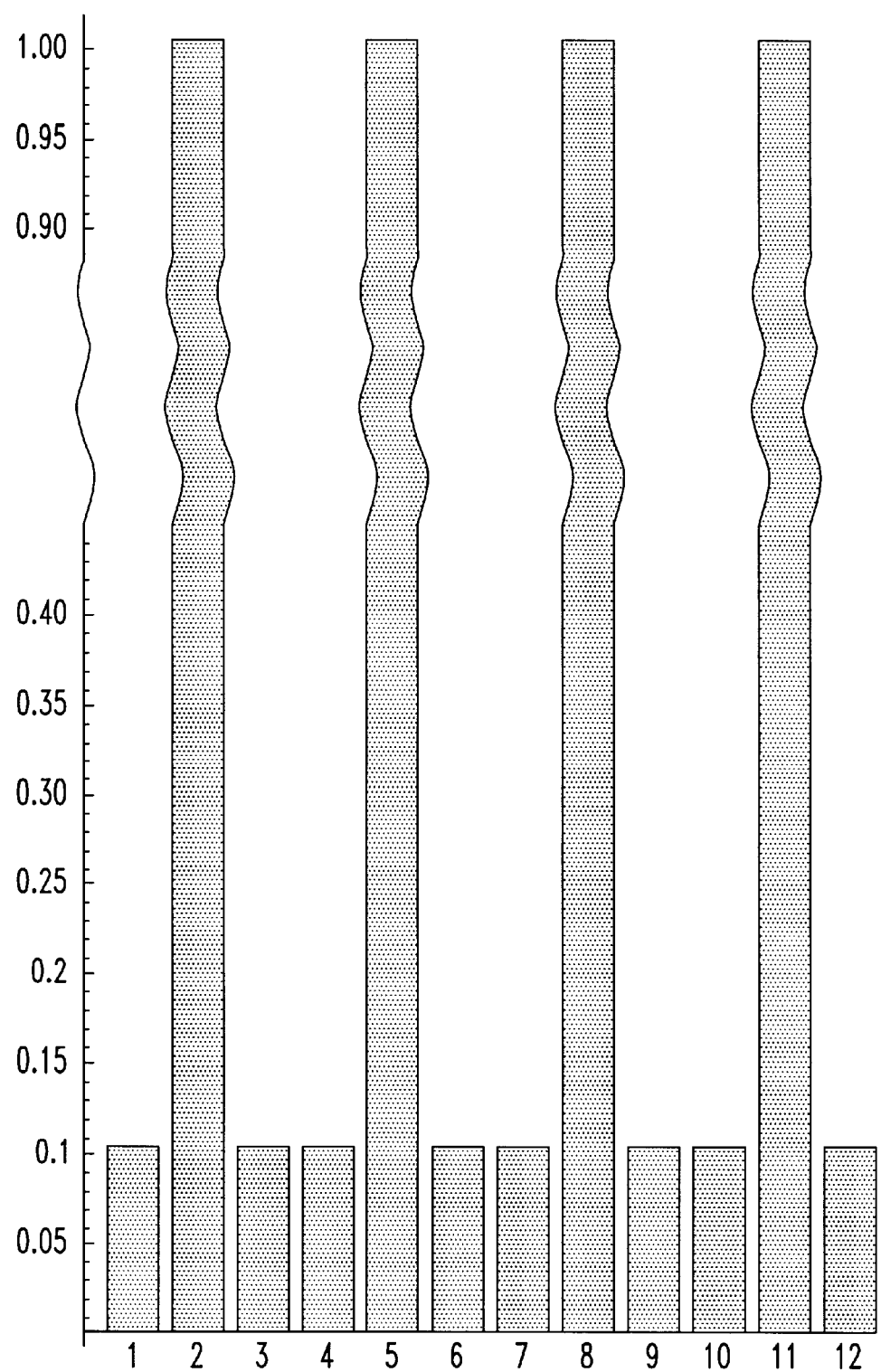
FIG. 10 is a bar graph of a simulated response to an input optical spectrum detected by a triple density array of optical detectors according to the present invention.
Figure 12:
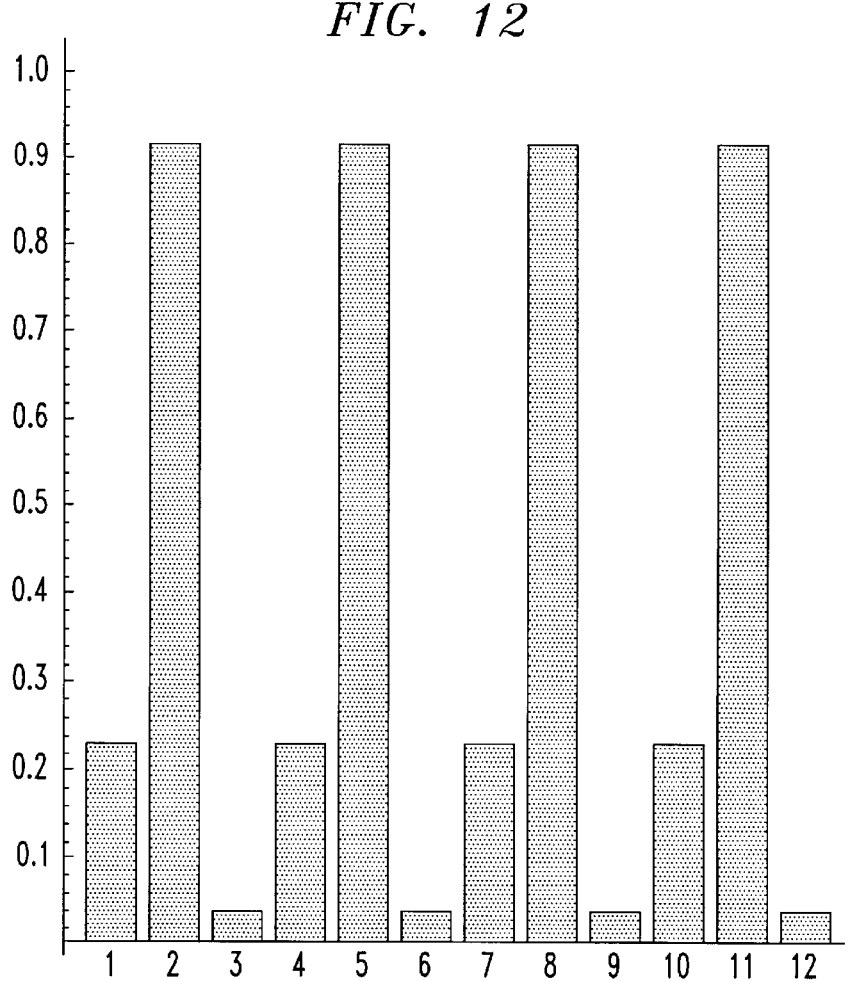
FIG. 12 is a bar graph of a simulated response to a second shifted optical spectrum from FIG. 10 detected by a triple density array of optical detectors according to the present invention.

FIG. 10 shows the response of a 12 element filter bank to a multiplexed optical signal having the aforementioned component optical signals. Again, the power of each component optical signal is assumed to be equal to one and to be unitless. The bar graph shown in FIG. 12 simulates output responses such as could be expected from twelve output waveguides 260 disposed along outer edge 265 of output star coupler 240 at locations where optical signals of wavelengths 1549.73 nm, 1550 nm, 1550.27 nm, 1550.53 nm, 1550.8 nm, 1551.07 nm, 1551.33 nm, 1551.6 nm, 1551.87 nm, 1552.13 nm, 1552.4 nm, and 1552.67 nm are expected to focus. Outputs 1 through 12 on the bar graph of FIG. 10 represent the responses of these output waveguides 260, respectively. FIG. 12 shows peaks at outputs 2, 5, 8, and 11 corresponding the aforementioned four component optical signals. Because of the response overlap for immediately adjacent filters, there are non-negligible responses shown at the other outputs 1, 3, 4, 6, 7, 9, 10, and 12.

The output waveguides 260 in the triple density embodiment preferably cover the same area along output edge 265 of output star coupler 240 as the double density embodiment, only more densely. As the density of output waveguides increase, the output star coupler 240 is preferably constructed such that the optical signals concentrating at positions along output edge 265 are more focussed in order to control the amount of response overlap between adjacent output waveguides 260, as shown by the narrower response characteristics of FIG. 9. The focus of optical signals concentrating along output edge 265 may be controlled, for example, by adjusting the spacing between output edge 265 and the input edge 267 of output star coupler 240.

Figure 11:
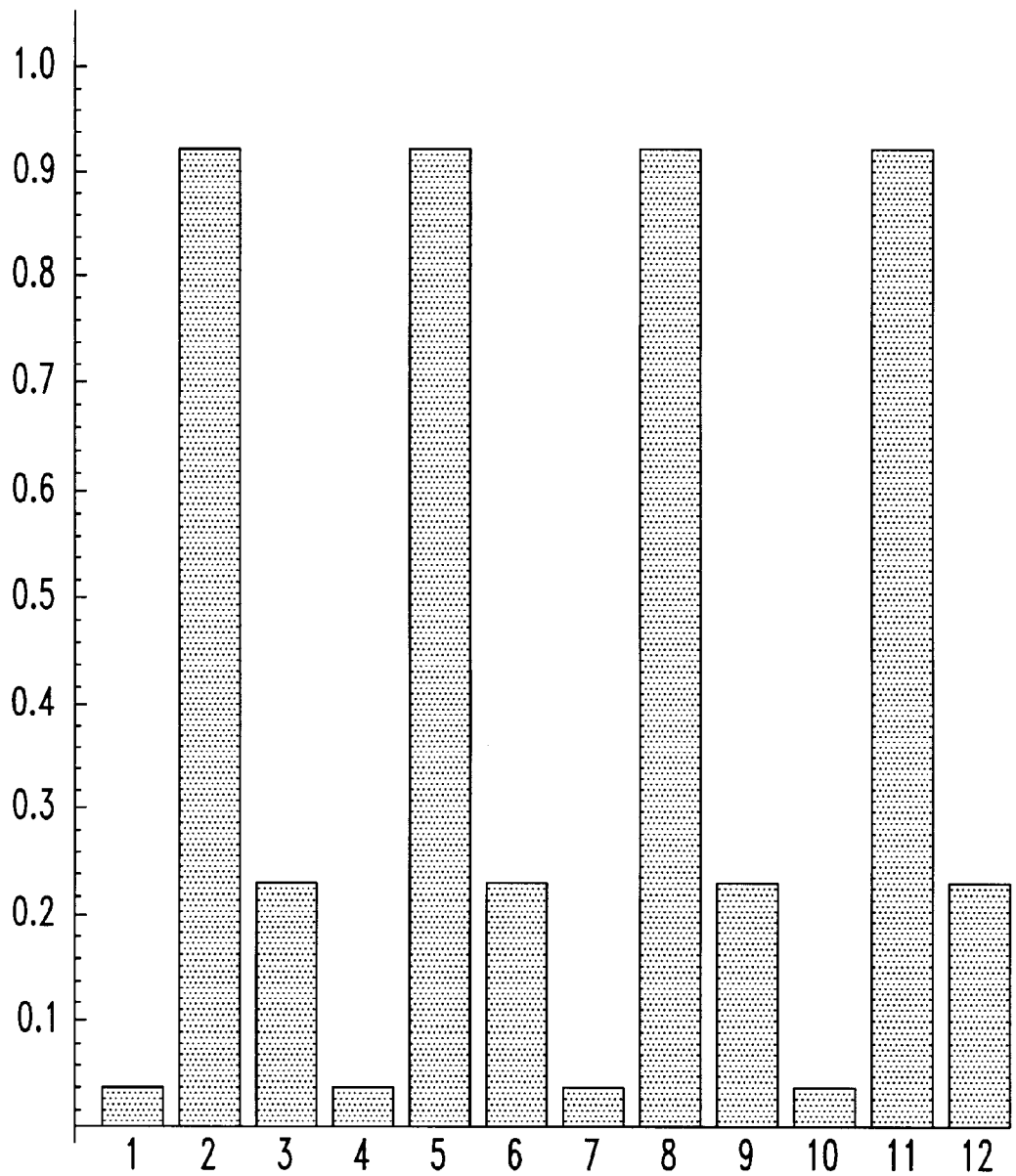
FIG. 11 is a bar graph of a simulated response to a shifted optical spectrum from FIG. 10 detected by a triple density array of optical detectors according to the present invention.

FIG. 11 is a bar graph of the responses when the wavelengths of the component optical signals are each increased by 0.05 nm. The responses shown at outputs 2, 5, 8, and 11 drop slightly from 1.000 to 0.924, or about 0.34 dB as a result of the increased wavelength of the component optical signals. The responses adjacent to outputs 2, 5, 8, and 11 show larger changes. Specifically, outputs 1, 4, 7, and 10 are reduced from approximately 0.1055 to approximately 0.0425, or about 3.94 dB. In contrast, outputs 3, 6, 9, and 12 show increases from 0.1055 to 0.2264, or about 3.32 dB. Similar results are shown in FIG. 12 when the wavelengths of the component optical signals decrease by 0.05 nm.

This simulations shows that the power and wavelength of a component optical signal may be determined by examining a peak response and the two responses adjacent to that peak when using a higher density of output waveguides 260, such as triple density. The examination may be done with little regard to rest of the responses because the other optical components cause little significant response at two or more wavelength spacings away. With a higher density of filters and narrower responses, the computational effort to disentangle the power and wavelength of individual component optical signals is greatly reduced.

Figure 13:
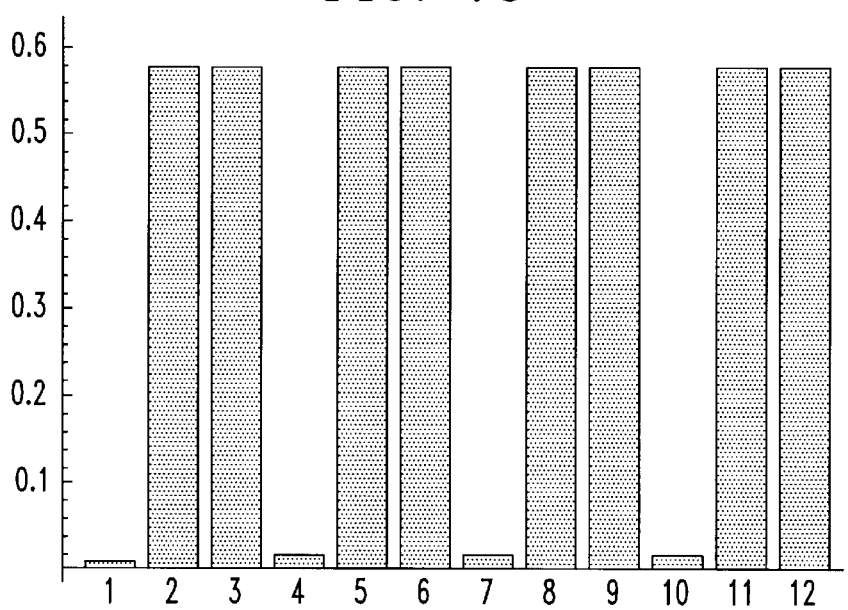
FIG. 13 is a bar graph of a simulated response to a third shifted optical spectrum from FIG. 10 detected by a triple density array of optical detectors according to the present invention.

In the triple density simulation, special consideration may be given to the situation where component optical signals are straddled between wavelength assignments for the filters, for example where the wavelengths of each component optical signal are increased by 0.133 nm or approximately one half of a filter spacing. FIG. 13 shows the expected responses for this particular optical spectrum. Pairs of responses share component optical signals, as seen in responses 2 and 3, 5 and 6, 8 and 9, and 11 and 12 where a pair of strong signals are apparent for two adjacent responses. The ratio of the strong responses determines the wavelength of the component optical signal, and the optical power of the component optical signal may be determined from the wavelength by knowing the response characteristic of either filter. Each filter in this simulation represents an output waveguide 260 of the optical waveguide router 200.

The response characteristics for each output waveguide 260 are known from the generation of the predetermined set of output responses in the same manner as determined for the double density embodiment. Indeed, the comparison of responses detected by optical detectors 310 to the predetermined set of output responses and the determination of the wavelength and powers of the component optical signals is similar to that of the double density example, only simplified because fewer than all of the output responses may be examined to determine the wavelength and power of any one component optical signal. Again the preferred embodiment of the apparatus for determining the wavelength and power of component optical signals of a multiplexed optical signal, e.g. monitor 40, includes software implemented on a programmable computer, microprocessor, microcontroller, or the like to compare the output signals to the predetermined set of output responses, as well as to determine the wavelength and power of the component optical signals from the comparison.

Figure 14:
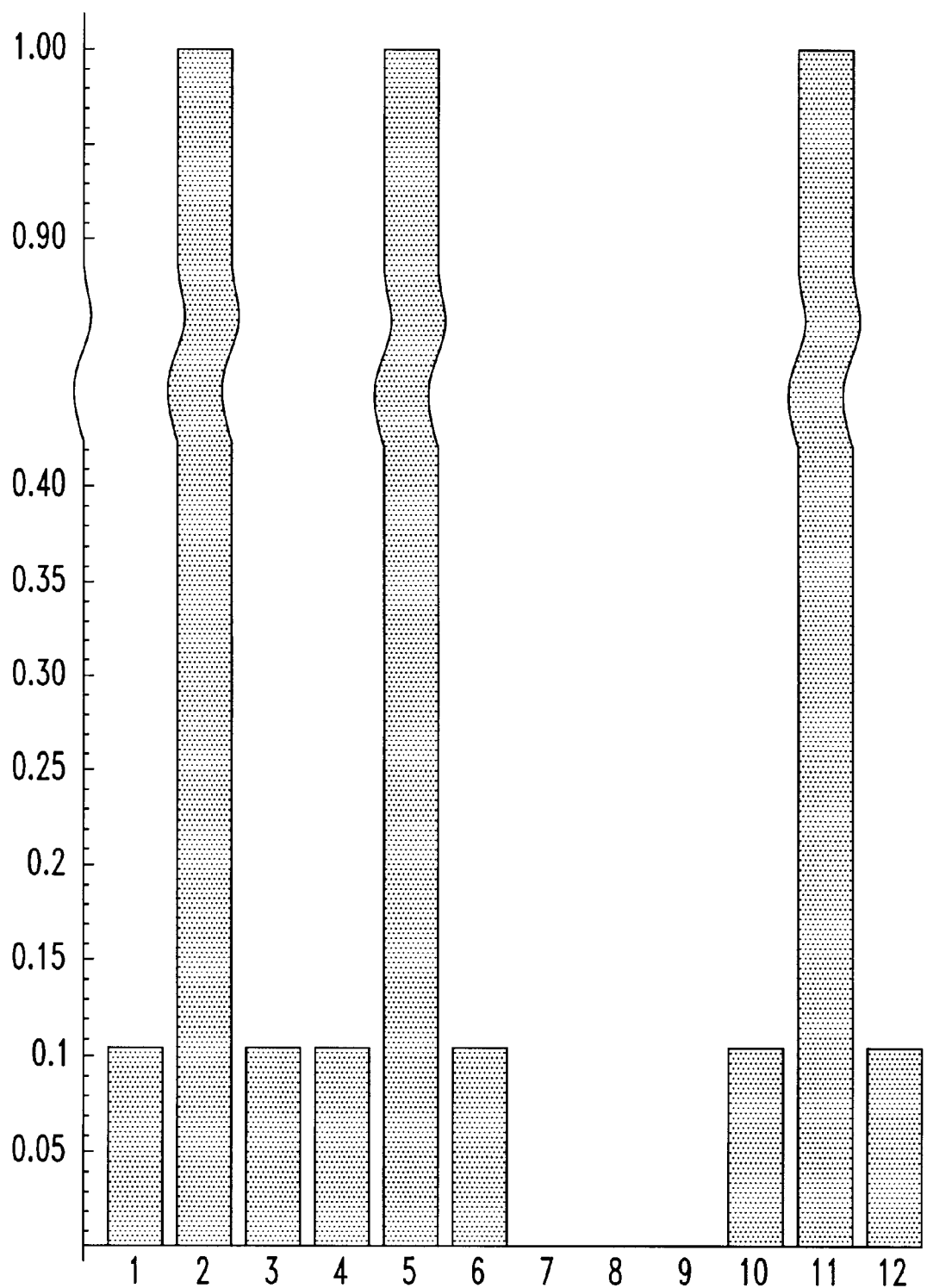
FIG. 14 is a bar graph of a simulated response to the optical spectrum from FIG. 10 with a missing component optical signal detected by a triple density array of optical detectors according to the present invention.

FIG. 14 shows the expected responses when a component optical signal is removed from an inputted multiplexed optical signal. The bar graph of FIG. 14 shows that outputs 7, 8, and 9 decrease to an almost zero response. It is apparent from outputs 7, 8, and 9 that the component optical signal having wavelength of 1551.8 nm is not present. The other outputs 1–6 and 10–12 show little if any response to the removal of this component optical signal.

It is recommended that the linear response of the optical detectors 310 of the array 300 be confirmed prior to generating the predetermined set of output responses. To verify that each output response has a linear response to changes in the power of the input optical signal, a tunable laser source with controllable output power may be connected to the input waveguide 215 of optical waveguide router 200. The wavelength of the tunable laser should be adjusted in turn to match the best response of each output waveguide 260. By varying the power of the input optical signal at each best response wavelength, it may be confirmed that the response of each output waveguide 260 linearly follows the power of the input optical signal. This linear response test also helps determine if one or more of the output responses are weak or non-existent, such as may occur if an optical or electrical connection is broken. The linear response test may also be used to confirm the linearity of any analog to digital conversion processing of the outputs detected by array 300.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention. For example, the double density and triple density embodiments are presented for illustrative purposes only, and higher density embodiments of output waveguides 260 are within the scope of the present invention.

What is claimed is:

1. An apparatus for determining the wavelength and power of component optical signals of a multiplexed optical signal, comprising:
   (a) an optical waveguide router, said optical waveguide router comprising:
      (i) an input star coupler, said input star coupler having at least one input waveguide and a plurality of output waveguides;
      (ii) a plurality of grating arms optically connected to said output waveguides of said input star coupler, said grating arms characterized by a path length difference between adjacent grating arms; and
      (iii) an output star coupler, said output star coupler having a plurality of input waveguides optically connected to said grating arms and at least twice as many output waveguides as the number of said component optical signals disposed at an output edge of said output star coupler;

(b) an array of optical detectors, said array comprising a plurality of optical detectors disposed to detect output optical signals from said output waveguides of said output star coupler, said optical detectors producing a plurality of electrical output signals corresponding to the power of each output optical signal;

(c) means for comparing said electrical output signals to a predetermined set of output responses;

(d) means for determining the wavelengths of said component optical signals from said comparison; and (e) means for determining the powers of said component optical signals from said comparison.

2. The apparatus of claim 1, wherein said optical detectors are photodetectors.

3. The apparatus of claim 1, wherein said output waveguides of said output star coupler are disposed at substantially equal increments at said output edge of said output star coupler.

4. The apparatus of claim 1, wherein said predetermined set of output responses comprises a set of recorded output responses generated from varying over a range of wavelengths the wavelength of a test input optical signal optically coupled to said input waveguide of said input star coupler.

5. The apparatus of 4, wherein said test input optical signal has substantially constant power.

6. The apparatus of claim 1, wherein said optical waveguide router is a planar waveguide circuit.

7. The apparatus of claim 1, wherein said output star coupler has at least three times as many output waveguides as the number of said component optical signals.

8. A method of determining the wavelength and power of component optical signals of a multiplexed optical signal, comprising the steps of:

(a) inputting said multiplexed optical signal into a waveguide router, said waveguide router comprising:
   (i) an input star coupler, said input star coupler having at least one input waveguide for accepting said multiplexed optical signal and a plurality of output waveguides;
   (ii) a plurality of grating arms optically connected to said output waveguides of said input star coupler, said grating arms characterized by a path length difference between adjacent grating arms; and
   (iii) an output star coupler, said output star coupler having a plurality of input waveguides optically connected to said grating arms and at least twice as many output waveguides as the number of said component optical signals disposed at an output edge of said output star coupler;

(b) detecting output optical signals from said output waveguides of said output star coupler;

(c) producing a plurality of electrical output signals corresponding to the power of each output optical signal;

(d) comparing said electrical output signals to a predetermined set of output responses;

(e) determining the wavelengths of said component optical signals from said comparison; and (f) determining the powers of said component optical signals from said comparison.

9. The method of claim 8, further including the step of generating said predetermined set of output responses from varying over a range of wavelength the wavelength of a test input optical signal optically coupled to said input waveguide of said input star coupler.

10. The method of claim 9, wherein said test input optical signal has substantially constant power.

11. The method of claim 8, wherein said output waveguides of said star coupler are disposed at substantially equal increments at an output edge of said output star coupler.

12. The method of claim 8, wherein said step of detecting said output optical signals includes the step of detecting said output optical signals with photodetectors.

13. An optical transmitter system, comprising:

a plurality of optical lasers, said optical lasers generating component optical signals;

at least one multiplexer producing a multiplexed optical signal from said component optical signals; and a monitor for determining the wavelength and power of said component optical signals of said multiplexed optical signal, said monitor comprising:

(a) an optical waveguide router, said optical waveguide router comprising:
   (i) an input star coupler, said input star coupler having at least one input waveguide and a plurality of output waveguides;
   (ii) a plurality of grating arms optically connected to said output waveguides of said input star coupler, said grating arms characterized by a path length difference between adjacent grating arms; and
   (iii) an output star coupler, said output star coupler having a plurality of input waveguides optically connected to said grating arms and at least twice as many output waveguides as the number of said component optical signals disposed at an output edge of said output star coupler;

(b) an array of optical detectors, said array comprising a plurality of optical detectors disposed to detect output optical signals from said output waveguides of said output star coupler, said optical detectors producing a plurality of electrical output signals corresponding to the power of each output optical signal;

(c) means for comparing said electrical output signals to a predetermined set of output responses;

(d) means for determining the wavelengths of said component optical signals from said comparison; and (e) means for determining the powers of said component optical signals from said comparison.

14. The system of claim 13, further comprising a tap disposed to direct a portion of said multiplexed optical signal to said input waveguide of said input star coupler of said waveguide router.

15. The system of claim 13, further comprising a plurality of modulators, said modulators modulating said component optical signals with input data to produce modulated optical signals.

16. The system of claim 13, wherein said optical detectors are photodetectors.

17. The system of claim 13, wherein said output waveguides of said output star coupler are disposed at equal increments at said output edge of said output star coupler.

18. The system of claim 13, wherein said optical waveguide router is a planar waveguide circuit.

19. The system of claim 13, wherein said output star coupler has at least three times as many output waveguides as the number of said component optical signals.

* * * * *